(12) United States Patent
Wenger et al.

(10) Patent No.: US 10,706,640 B2
(45) Date of Patent: Jul. 7, 2020

(54) SYSTEM AND METHOD FOR IDENTIFYING A POWER TOOL

(71) Applicant: BLACK & DECKER INC., New Britain, CT (US)

(72) Inventors: Kevin Wenger, Bel Air, MD (US); Oleksiy P. Sergyeyenko, Baldwin, MD (US); Steven J. Phillips, Ellicott City, MD (US); David C. Campbell, Bel Air, MD (US); Renee Pie, Baltimore, MD (US); Leisa Glispy, Lancaster, PA (US); Jennifer Bloomer, Baltimore, MD (US); Renee Folger, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/008,550

(22) Filed: Jan. 28, 2016

(65) Prior Publication Data

US 2016/0171788 A1 Jun. 16, 2016

Related U.S. Application Data

(63) Continuation of application No. 14/023,580, filed on Sep. 11, 2013, now Pat. No. 9,256,988.

(Continued)

(51) Int. Cl.
*H04Q 5/22* (2006.01)
*G07C 3/02* (2006.01)
*B25F 5/00* (2006.01)

(52) U.S. Cl.
CPC .................. *G07C 3/02* (2013.01); *B25F 5/00* (2013.01); *G05B 2219/37435* (2013.01); *Y10T 408/172* (2015.01)

(58) Field of Classification Search
CPC ......... G07C 3/02; B25F 5/00; Y10T 408/172; G05B 2219/37435

(Continued)

(56) References Cited

U.S. PATENT DOCUMENTS

| 4,351,029 A | 9/1982 | Maxey et al. |
| 5,307,263 A | 4/1994 | Brown |

(Continued)

FOREIGN PATENT DOCUMENTS

| DE | 102007035095 | 1/2009 |
| EP | 1050749 | 11/2000 |

(Continued)

OTHER PUBLICATIONS

International Search Report of Application No. PCT/US2013/059196 dated Mar. 13, 2014.

*Primary Examiner* — Naomi J Small
(74) *Attorney, Agent, or Firm* — Stephen R. Valancius

(57) ABSTRACT

A system for identifying a type of a power tool, the system comprising: a power tool having an electric motor; and a usage attachment configured to couple to the power tool, the usage attachment having a vibration sensor that generates vibration data when the power tool vibrates, a memory that stores the vibration data generated by the vibration sensor, and an identification subsystem that receives the vibration data from the memory, and identifies the type of the power tool by comparing the received vibration data to predetermined vibration data of a known type of power tool.

7 Claims, 10 Drawing Sheets

Related U.S. Application Data

(60) Provisional application No. 61/707,049, filed on Sep. 28, 2012, provisional application No. 61/699,318, filed on Sep. 11, 2012.

(58) Field of Classification Search
USPC .................................................. 340/10.1
See application file for complete search history.

(56) References Cited

U.S. PATENT DOCUMENTS

| | | | |
|---|---|---|---|
| 5,897,493 | A | 4/1999 | Brown |
| 5,899,855 | A | 5/1999 | Brown |
| 5,933,136 | A | 8/1999 | Brown |
| 5,997,476 | A | 12/1999 | Brown |
| 5,999,908 | A | 12/1999 | Abelow |
| 6,151,586 | A | 11/2000 | Brown |
| 6,168,563 | B1 | 1/2001 | Brown |
| 6,368,273 | B1 | 4/2002 | Brown |
| 6,374,195 | B1 | 4/2002 | Li et al. |
| 6,607,041 | B2 | 8/2003 | Suzuki et al. |
| 6,839,660 | B2 | 1/2005 | Eryurek et al. |
| 6,845,279 | B1 | 1/2005 | Gilmore et al. |
| 7,036,605 | B2 | 5/2006 | Suzuki et al. |
| 7,054,696 | B2 | 5/2006 | Crowell |
| 7,065,456 | B1 | 6/2006 | Butka et al. |
| 7,330,129 | B2 | 2/2008 | Crowell et al. |
| 7,346,406 | B2 | 3/2008 | Brotto et al. |
| 7,421,426 | B2 | 9/2008 | Berstis et al. |
| 7,433,866 | B2 | 10/2008 | Berstis et al. |
| 7,613,590 | B2 | 11/2009 | Brown |
| RE41,160 | E | 3/2010 | Gilmore et al. |
| RE41,185 | E | 3/2010 | Gilmore et al. |
| 7,896,098 | B2 | 3/2011 | Suzuki et al. |
| 7,987,112 | B2 | 7/2011 | Jones |
| 8,049,636 | B2 | 11/2011 | Buckingham et al. |
| 8,073,852 | B2 | 12/2011 | Berstis et al. |
| 8,170,800 | B2 | 5/2012 | Aamodt et al. |
| 8,210,275 | B2 | 7/2012 | Suzuki et al. |
| 8,275,642 | B2 | 9/2012 | Chan et al. |
| 8,406,697 | B2 | 3/2013 | Arimura et al. |
| 8,412,179 | B2 | 4/2013 | Gerold et al. |
| 8,463,766 | B1 | 6/2013 | Berstis et al. |
| 2002/0177792 | A1 | 11/2002 | Ooba |
| 2003/0037423 | A1* | 2/2003 | Siegel ................. B23P 19/066 29/407.01 |
| 2003/0065564 | A1 | 4/2003 | Carroll et al. |
| 2006/0005358 | A1* | 1/2006 | Kemmler ................. B25F 5/02 16/430 |
| 2006/0074513 | A1 | 4/2006 | DeRose et al. |
| 2006/0224451 | A1 | 10/2006 | Kerschbrock et al. |
| 2007/0090788 | A1 | 4/2007 | Hansford et al. |
| 2007/0136129 | A1 | 6/2007 | Handley et al. |
| 2007/0162292 | A1 | 7/2007 | Bell et al. |
| 2008/0252446 | A1 | 10/2008 | Dammetz |
| 2009/0040061 | A1* | 2/2009 | Golunski ................. G07C 3/08 340/683 |
| 2009/0091465 | A1* | 4/2009 | Buckingham ............ A61B 5/11 340/683 |
| 2009/0100933 | A1* | 4/2009 | Brunson ................. A61B 5/11 73/577 |
| 2009/0138116 | A1* | 5/2009 | Austin ............ G05B 19/41805 700/108 |
| 2009/0140154 | A1* | 6/2009 | Roth ........................ B25F 5/00 250/370.07 |
| 2009/0251330 | A1 | 10/2009 | Gerold et al. |
| 2010/0179856 | A1 | 7/2010 | Paretti et al. |
| 2010/0241501 | A1 | 9/2010 | Marshall |
| 2011/0049247 | A1 | 3/2011 | Black |
| 2011/0125509 | A1 | 5/2011 | Lidstrom et al. |
| 2012/0005906 | A1* | 1/2012 | Koeder ................. B23D 59/003 30/392 |
| 2012/0033198 | A1 | 2/2012 | Ume |
| 2012/0133526 | A1 | 5/2012 | Christiansen |
| 2012/0215637 | A1 | 8/2012 | Hermann |
| 2012/0318545 | A1 | 12/2012 | Schreiber |
| 2013/0046604 | A1 | 2/2013 | Jones et al. |
| 2013/0080062 | A1 | 3/2013 | Aamodt et al. |
| 2013/0092408 | A1* | 4/2013 | Oberheim ............... B25F 5/006 173/2 |

FOREIGN PATENT DOCUMENTS

| | | |
|---|---|---|
| GB | 2420623 | 5/2006 |
| JP | 2008213068 | 9/2008 |
| WO | WO2007072068 | 6/2007 |
| WO | WO2010041059 | 10/2009 |

* cited by examiner

SYSTEM AND METHOD FOR IDENTIFYING A POWER TOOL

CROSS-REFERENCE TO RELATED APPLICATIONS

This application is a continuation application of U.S. application Ser. No. 14/023,580, entitled SYSTEM AND METHOD FOR IDENTIFYING A POWER TOOL, filed Sep. 11, 2013, which is hereby incorporated by reference in its entirety. U.S. application Ser. No. 14/023,580 claims the benefit of U.S. Provisional Application No. 61/699,318 filed on Sep. 11, 2012; and U.S. Provisional Application No. 61/707,049 filed on Sep. 28, 2012. The entire disclosures of each of the above applications are incorporated herein by reference.

FIELD

The present disclosure relates to power tools and more specifically to a system and method for identifying a power tool.

BACKGROUND

Some newer power tools have sensors that measure power tool usage characteristics. This measured data can be used by manufacturers to determine how their power tools are being used. This data can also be used by power tool users to monitor usage of their power tools. Many older power tools do not have such sensors that measure their usage characteristics. Therefore, there is a need for a system that allows measurement of power tool characteristics for power tools that do not have built-in sensors.

Some power tool users may benefit from access to certain resources such as internet websites, blogs, product reviews on power tools, etc. Due to the vast number of resources available on the internet, a user searching for resources may become overwhelmed with resources that may not be relevant to the user. For example, a novice power drill user searching the internet on how to change the drill bit of the power drill may get directed to a blog of more advanced topics that may be of little or no use to this novice power drill user. Therefore, there is a need for a system that provides a power tool user with access to resources that are relevant to that power tool user.

This section provides background information related to the present disclosure which is not necessarily prior art.

SUMMARY

This section provides a general summary of the disclosure, and is not a comprehensive disclosure of its full scope or all of its features.

A system is provided for identifying a type of power tool. The system is comprised generally of a power tool, a usage attachment and an identification subsystem. The usage attachment is configured to attach to the power tool. The usage attachment includes a sensor that senses a usage characteristic of the power tool and generates usage data for the sensed usage characteristic, a memory that stores the usage data generated by the sensor, a transmitter that transmits the usage data generated by the sensor, and a controller in data communication with the sensor, the memory and the transmitter. The identification subsystem is configured to receive the usage data via a wireless data link and operates to identify the type of power tool from the usage data.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
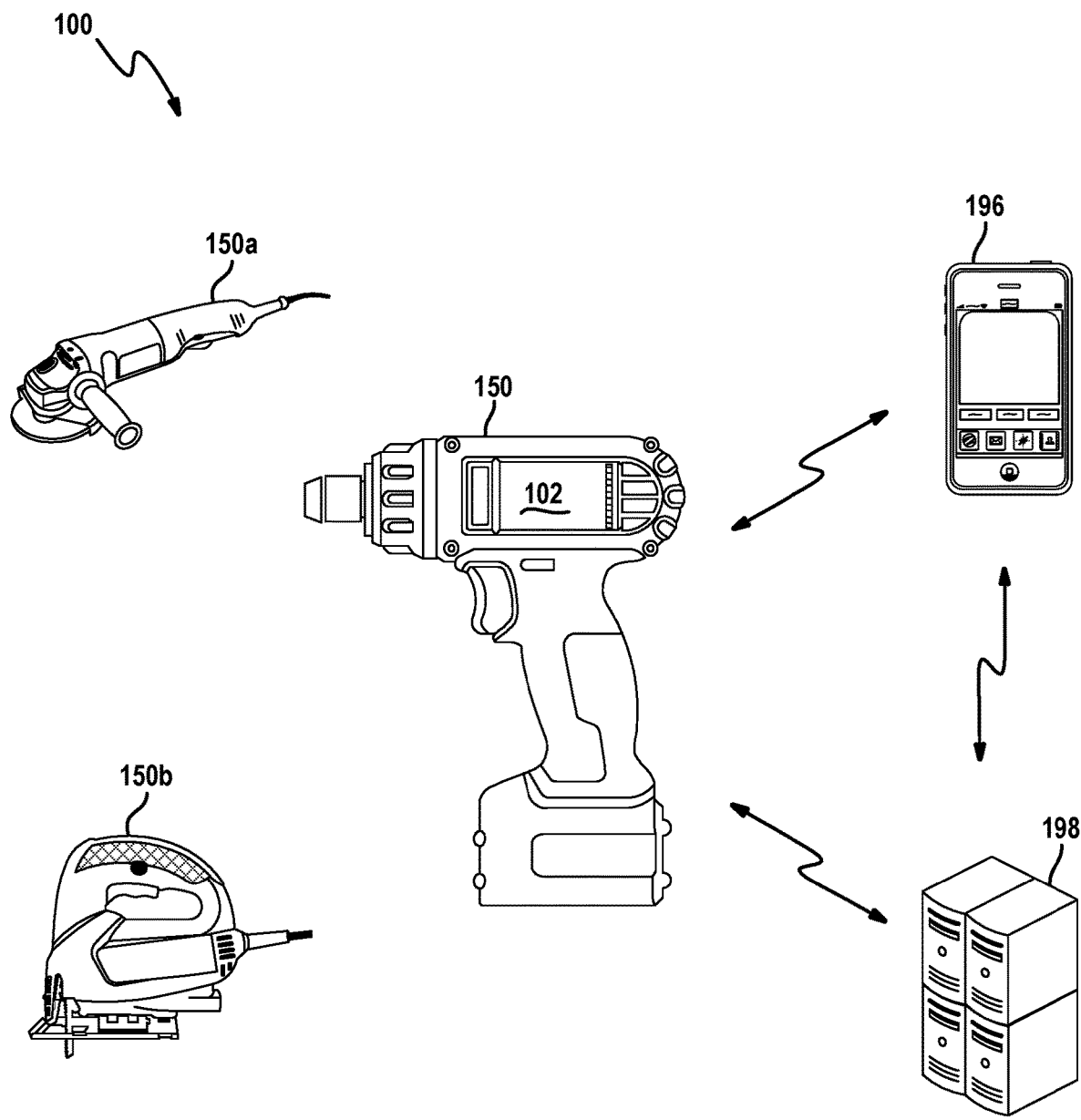
FIG. 1A is a diagram illustrating an example system for identifying a power tool.

FIG. 1A is a diagram illustrating an example system 100 for identifying a power tool. The system 100 includes a usage attachment 102 that is coupled to an example power tool 150. As shown, the usage attachment 102 is attached to a housing of the power tool 150. When the usage attachment 102 is coupled to the power tool 150, the usage attachment 102 measures certain usage characteristics of the power tool 150. A user can detach the usage attachment 102 from the power tool 150 and attach the usage attachment 102 to another power tool 150a or 150b. Advantageously, the user does not need a separate usage attachment for each power tool.

The usage attachment 102 selectively transmits the measured usage characteristics to a mobile phone 196 and the mobile phone 196 transmits the usage characteristics to a server 198. Alternatively, the usage attachment 102 transmits the measured usage characteristics directly to the server 198. Although FIG. 1A shows the usage characteristics being transmitted wirelessly, a wired interface is also contemplated. Although in this embodiment, the usage attachment 102 is shown as being separate from the power tool 150, in other embodiments, the usage attachment 102 can be integrated with the power tool 150, for example by positioning the usage attachment 102 inside the housing of the power tool 150.

Since the usage attachment 102 can be coupled to different types of power tools, there is a need to identify a type of the power tool to which the usage attachment 102 is coupled. In accordance with the principles of the present disclosure, the system 100 identifies the type of the power tool to which the usage attachment 102 is coupled. The system 100 identifies the type of the power tool based on the usage characteristics measured by the usage attachment 102.

Example power tool types include a power drill, an electric sander and an electric jigsaw. In some embodiments, the usage attachment 102 can be coupled to other devices (e.g. blenders, food processors, washing machines, dryers, etc) and the system 100 can be used to identify the type of the device the usage attachment 102 is coupled to.

The usage attachment 102 includes one or more sensors that measure usage characteristics of the power tool 150. The system 100 compares the measured usage characteristics with predetermined usage characteristics of a known type of power tool. The system 100 identifies the type of the power tool 150 based on the comparison between the measured usage characteristics and predetermine usage characteristics for known types of tools.

In an example embodiment, the sensor includes a vibration sensor (e.g. an accelerometer) that detects vibrations of the power tool 150 and generates vibration data. The system 100 compares the generated vibration data with predetermined vibration data of a known type of power tool and identifies the type of the power tool 150 as the known type based on the comparison. As explained below, the predetermined vibration data may include a dominant resonant frequency and the system 100 may identify the type of the power tool 150 as the known type if the dominant resonant frequency is dominant in the captured vibration data.

In another example embodiment, the sensor includes a microphone that captures sounds data. The sound data may represent sounds produced by the power tool 150 and/or the environment in which the power tool 150 is used. The system 100 compares the captured sound data with predetermined sound data of a known type of power tool and identifies the type of the power tool 150 as the known type based on the comparison. In an example scenario, a power drill may be known to produce sounds in a given frequency range, the system 100 can identify the type of the power tool 150 as the power drill if the captured sound data includes a spike within the given frequency range. In another example scenario, the captured sound data may include voice commands that the user may have spoken (e.g. "drill ON"), the system 100 may identify the type of the power tool 150 as the known type if the captured sound data includes a particular phrase (e.g. the power tool 150 may be identified as a power drill if the user said "drill ON").

In yet another example embodiment, the sensor includes a light sensor (e.g. a photodetector) that captures light data representing the ambient light level of the environment in which the power tool 150 is used. The system 100 compares the captured light data with predetermined light data of a known type of power tool and identifies the type of the power tool 150 as the known type based on the comparison. In an example scenario, a welding machine may be known to have an ambient light level that is greater than 3,000 lux, the system 100 can identify the type of the power tool 150 as the welding machine if the captured light data includes an ambient light level that is greater than 3,000 lux. In another example scenario, an electric sander may be known to be operated in lighting levels that are above 750 lux, the system 100 can identify the type of the power tool 150 as the electric sander if the captured light data includes an ambient light level that is greater than 750 lux and less than 3,000 lux.

In a further example embodiment, the sensor includes a temperature sensor that captures temperature data. The temperature data may represent the temperature of the power tool 150 or the temperature of the environment in which the power tool 150 is used. The system 100 compares the captured temperature data with predetermined temperature data of a known type of power tool and identifies the type of the power tool 150 as the known type based on the comparison. In an example scenario, a welding machine may be known to produce temperatures that are greater than 3000° C., the system 100 can identify the type of the power tool 150 as the welding machine if the captured temperature data includes a temperature level that is greater than 3,000° C.

In yet another example embodiment, the sensor includes a current sensor that captures current data representing a current level that the power tool 150 draws when the power tool 150 is operated. The system 100 compares the captured current data with predetermined current data of a known type of power tool and identifies the type of the power tool 150 as the known type based on the comparison. In an example scenario, a power drill may draw current ranging from 8 to 12 A, and an electric sander may draw current ranging from 2 to 6 A. In this example scenario, the system 100 may identify the type of the power tool 150 as the power drill if the captured current data ranges from 8 to 12 A, and as the electric sander if the captured current data ranges from 2 to 6 A.

The system 100 may use a combination of one or more of the captured vibration data, sound data, light data, temperature data and captured current data to identify the type of the power tool 150.

Figure 1B:
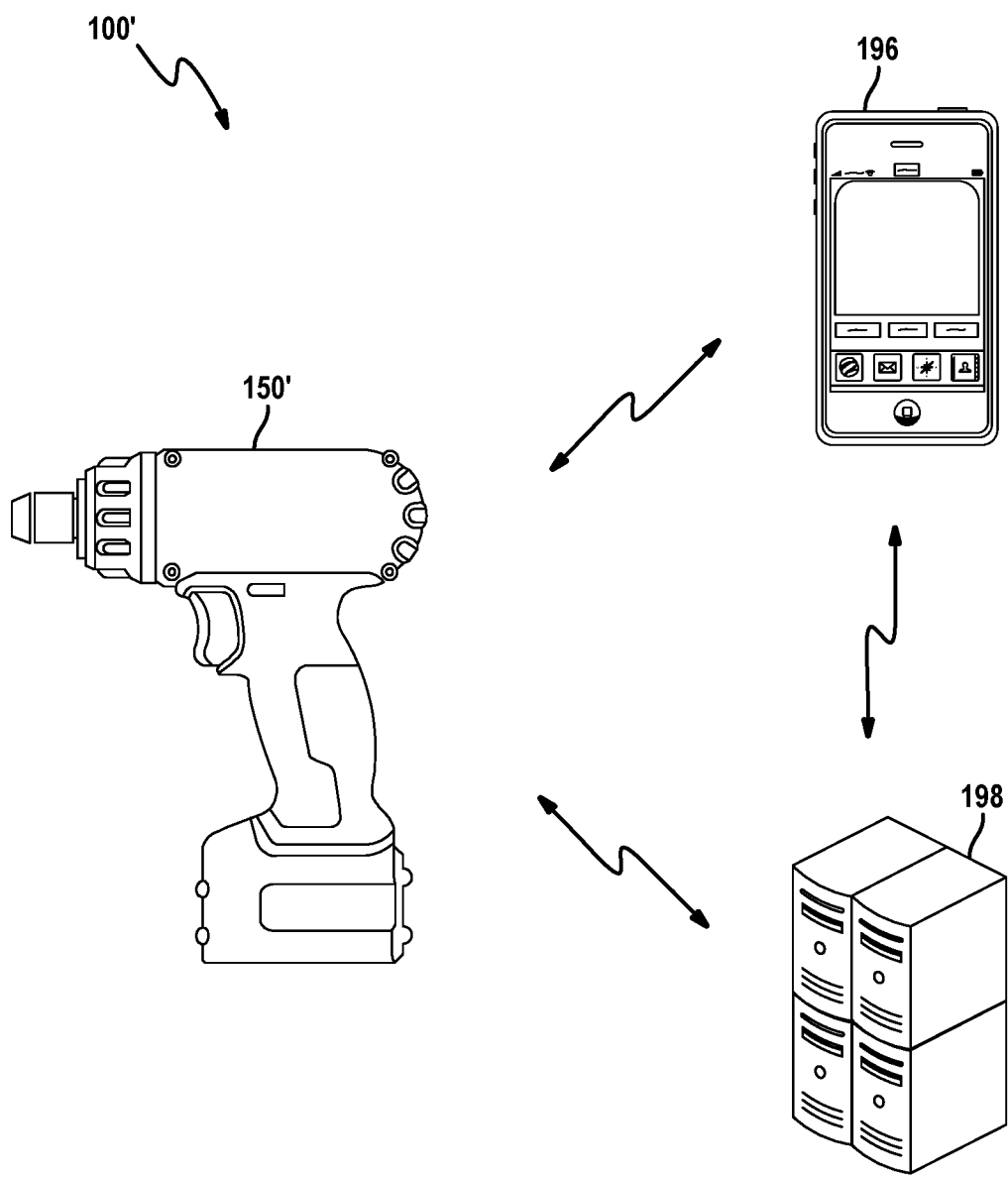
FIG. 1B is a diagram illustrating another example system for identifying a power tool.

FIG. 1B is a diagram illustrating another example system 100' in which a power tool 150' communicates with the mobile phone 196 and/or the server 198. The power tool 150' is different from the power tool 150 in that the power tool 150' includes one or more sensors that measure usage characteristics of the power tool 150' and transmit the usage characteristics of the power tool 150' to the mobile phone 196 and/or the server 198. In this embodiment, a separate usage attachment 102 need not be attached to the exterior of the power tool 150'.

Figure 2:
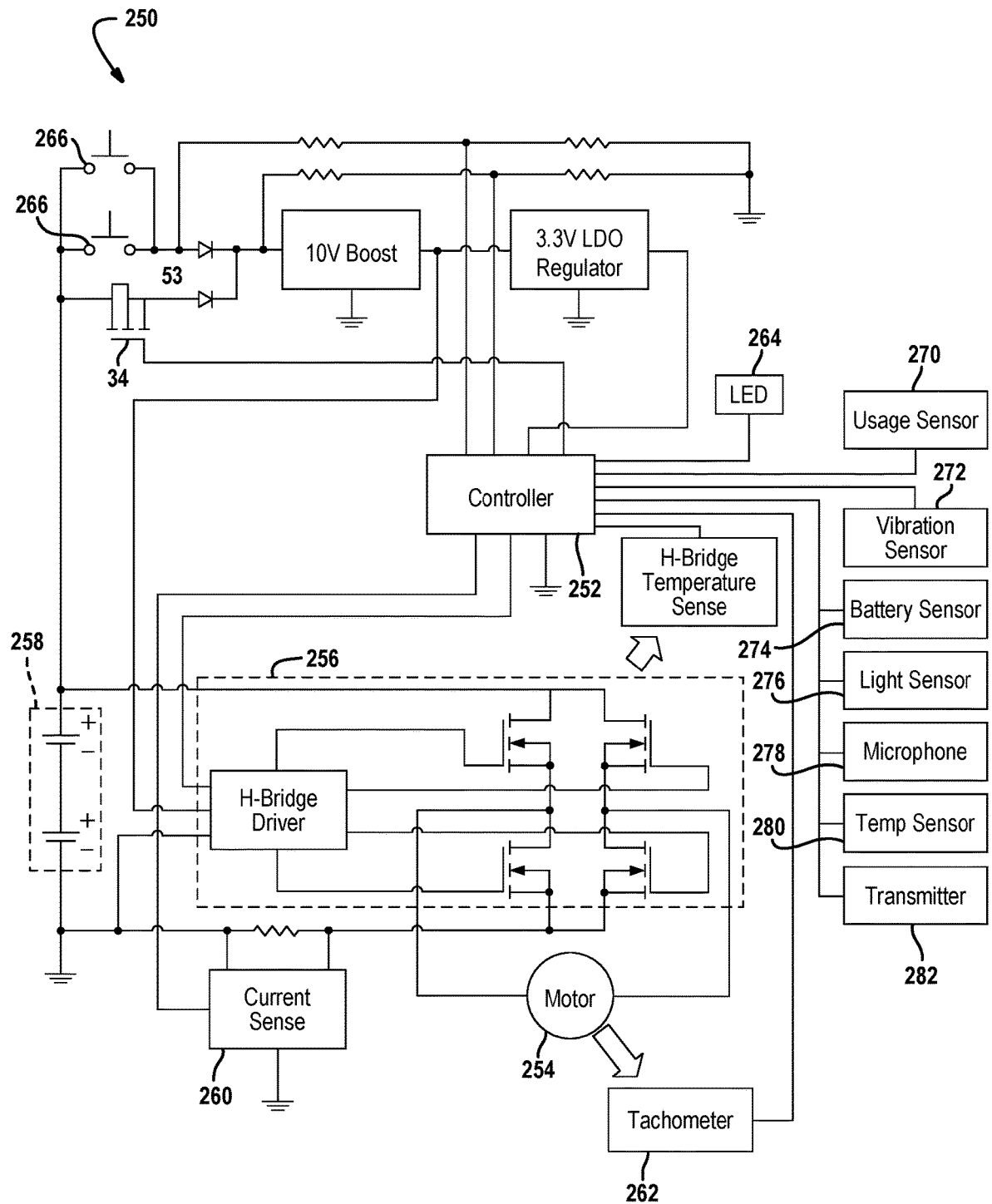
FIG. 2 is a schematic diagram of an example power tool.

FIG. 2 is a schematic diagram illustrating an example power tool 250. Components residing in the housing of the power tool 250 include a controller 252 electrically connected to an electric motor 254. A motor drive circuit 256 enables voltage from a battery 258 to be applied across the electric motor 254 in either direction. The electric motor 254 in turn drivably connects through a transmission (not shown) to an end effector of the power tool 250. In this embodiment, the motor drive circuit 256 is an H-bridge circuit arrangement although other arrangements are contemplated. The power tool 250 may also include a current sensor 260, a tachometer 262 and/or a LED 264. In some embodiments, the power tool 250 may be an alternative current (AC) power tool that receives power through an electrical cord instead of or in addition to the battery 258.

In this embodiment, a power tool operator actuates a trigger switch to initiate tool operation. The trigger switch assembly is comprised primarily of an elongated casing (not shown) that houses at least one momentary switch 266 and a biasing member (not shown), such as a spring. If there are two or more switches 266, the switches 266 are arranged electrically in parallel with each other such that only one of the switches 266 needs to be actuated to power on the power tool 250. When the operator releases the trigger, the biasing member biases the casing away from the power tool 250, thereby returning each of the switches 266 to an OFF position.

The housing of the power tool 250 may also include a plurality of sensors. The plurality of sensors may include a usage sensor 270, a vibration sensor 272, a battery sensor 274, a light sensor 276, a microphone 278, a temperature sensor 280, and a transmitter 282. The usage sensor 270 determines how a power tool operator is interacting with the power tool 250. For example, the usage sensor 270 monitors how often the power tool 250 is in operation.

In an example embodiment, the usage sensor 270 may be arranged to include an electromagnetic field (EMF) sensor. The EMF sensor senses the electrical current changes of the power tool 250. Changes in the electrical current may be indicative of the power tool 250 starting and/or stopping. The usage sensor 270 records a value indicative of a start time of the power tool 250 in a power tool usage table. When the power tool 250 is powered off, the usage sensor 270 records a value indicative of a stop time of the power tool 250 in the power tool usage table. The usage sensor 270 then calculates an amount of time the power tool 250 was in operation and records a value indicative of an operation duration of the power tool 250. The usage sensor 270 continues to monitor the power tool 250 and record respective start and stop times.

By calculating operation duration values of the power tool 250, the usage sensor 270 can determine how long the power tool 250 was in operation and how long the power tool 250 was not in operation. At a predefined period, the usage sensor 270 sums the previously calculated operation durations of the power tool 250 and communicates the resulting summation to the controller 252. Similarly, the usage sensor 270 sums the previously calculated nonoperation durations of the power tool 250 and communicates the resulting summation to the controller 252. The predefined period may be a period defined by a lookup table of values. The controller 252 then communicates the received summations to the transmitter 282. The transmitter 282 then communicates the total operation duration and the total nonoperation duration to the mobile phone 196 and/or the server 198.

The vibration sensor 272 detects a vibration of the power tool 250 and captures the vibration generated by the power tool 250. The vibration sensor 272 may include a 3-axis accelerometer that captures vibration data in time domain in three different axes, for example an X-axis, a Y-axis and a Z-axis. Other vibration sensors are also contemplated, for example a 1-axis accelerometer, a 2-axis accelerometer, a gyroscope or the like. A 1-axis accelerometer or a 2-axis accelerometer can be aligned such that the vibrations occur in the axes in which vibration data is detected. The vibration sensor 272 generates vibration data when the power tool 250 is turned on and the electric motor 254 is operating. The vibration sensor 272 also generates vibration data when the power tool 250 is being carried or is dropped by the user. The vibration sensor 272 communicates a value indicative of the vibration data of the power tool 250 to the controller 252. The controller 252 then communicates the value to the transmitter 282 after a predefined period. In some embodiments, vibration data of the power tool 250 is used to identify the type of the power tool 250 to a known type of power tool, such as a power drill, an electric sander or an electric jigsaw. Vibration data may also be used to identify the type of the user or tool operator (e.g. novice, intermediate or professional).

The battery sensor 274 measures time values related to a charge level of the battery 258. For example, the battery sensor 274 may Measure a period between battery charges. The battery sensor 274 records a first time value indicative of a time when the battery 258 is charged to 100%. The first time value may be recorded in a table of values. The battery sensor 274 then records a second time value. The second time value may be indicative of when the battery 258 is below a predetermined threshold. The predetermined threshold may be between 0% and 10%. The battery sensor 274 communicates the first and second time values to the controller 252. Battery charge measures can be used, for example to advise the tool operator to charge or replace the battery 258.

The light sensor 276 measures ambient light proximal to the power tool 250. At a predefined period, the light sensor 276 communicates a value indicative of the amount of ambient light surrounding the power tool 250 to the controller 252. Light measures can be used, for example to advise the tool operator whether the tool is being used in proper light conditions for the task.

The microphone 278 measures sound levels proximal to the power tool 250. The ambient sound may be indicative of the condition of the space surrounding the power tool 250. The microphone 278 communicates the measured sound levels to the controller 252. Similarly, the temperature sensor 280 measures a temperature of the power tool 250 and communicates, at a predefined period, a value indicative of the temperature of the power tool 250 to the controller 252. Temperature measures can be used, for example to advise novice users to let the power tool cool down when the temperature exceeds a safe operating threshold.

The controller 252 communicates values received from each of the usage sensor 270, the vibration sensor 272, the battery sensor 274, the light sensor 276, the microphone 278, and the temperature sensor 280 to the transmitter 282. The transmitter 282 then communicates the received values to the mobile phone 196 or the server 198 at a predefined period or in response to receiving a request from the tool operator. The predefined period may be defined as a factory installed value. For example, the predefined period may be set while the power tool 250 is being assembled. The predefined period may be daily, weekly, monthly, or any other period of time. The predefined period may also be remotely updated. For example, the mobile phone 196 or the server 198 may send a signal to the power tool 250 through a wireless network to update the predefined period.

Figure 3:
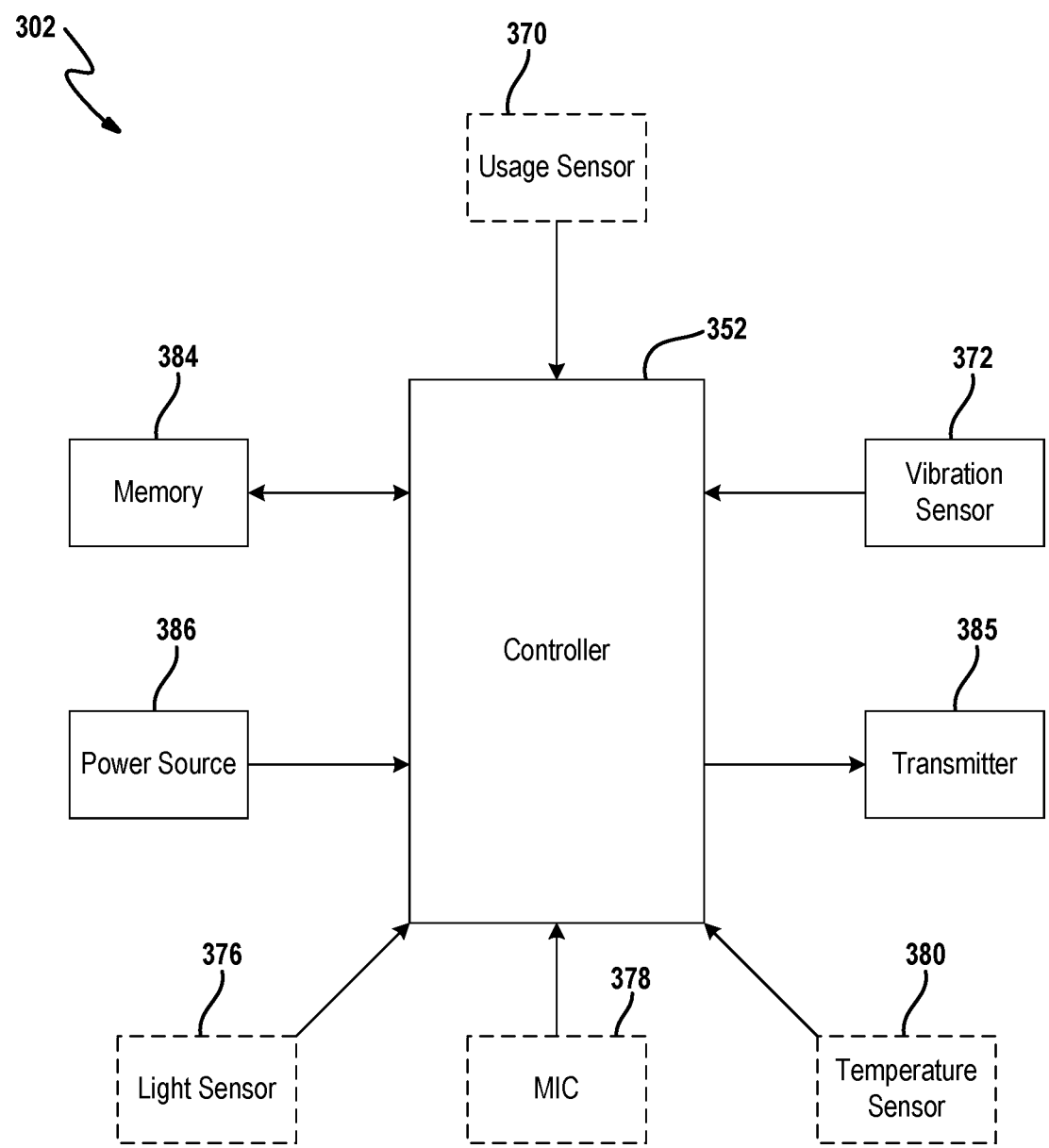
FIG. 3 is a schematic diagram of an example usage attachment.

FIG. 3 is a block diagram illustrating an example usage attachment 302. The usage attachment 302 includes a vibration sensor 372, a transmitter 382 and a memory 384. The usage attachment 302 may include a power source 386 and other sensors, such as a usage sensor 370, a light sensor 376, a microphone 378 and a temperature sensor 380 that are similar to the usage sensor 270, the light sensor 276 and the temperature sensor 280, respectively.

The usage attachment 302 further includes an attachment feature for attaching to the power tool 150. For example, the usage attachment 302 can include geometrical features to allow a mechanical interlock with the tool housing, such as including a bayonet style attachment, a compliant snap fit attachment, or a hook and loop system of attachment. The usage attachment 302 may alternatively or additionally be connected by magnetic means. For example, the usage attachment 302 may include a magnet or ferrous metal and the power tool 150 a counterpart magnet or ferrous metal such that usage attachment 302 is held to the power tool 150 when placed thereon. It is also contemplated that a suction cup to smooth surface vacuum connection system or releasable adhesive to smooth surface connection system may be used. In such cases, either the attachment 302 may have a suction cup or adhesive that could reliably connect to a smooth surface of a power tool 150. In another embodiment, the attachment 302 102 may be provided with a strap that could wrap around the power tool 150 to secure the usage module 102 in the proper position. Other types of attachment features are also contemplated by this disclosure.

When the usage attachment 302 is coupled to a power tool, the vibration sensor 372 detects vibrations of the power tool and generates vibration data. The vibration sensor 372 may include a 3-axis accelerometer that captures vibration data in time domain in three different axes, for example an X-axis, a Y-axis and a Z-axis. Other vibration sensors are also contemplated. The vibration data is used to identify the type of the power tool and/or the type of the tool operator.

Vibration data generated by the vibration sensor 372 is stored in the memory 384. The controller 352 retrieves the vibration data from the memory 384 and selectively transmits the vibration data via the transmitter 382. The vibration data can be transmitted to the mobile phone 196 or the server 198. The vibration data can be transmitted periodically, for example once a day. The vibration data can also be transmitted in response to a detected event, such as the power tool being turned on or off. Alternatively, the vibration data can be transmitted in response to a request from the mobile phone 196, the server 198 or the user. The transmitter 382 includes a wireless transmitter, such as a Bluetooth transmitter that supports Bluetooth Low Energy (BLE) mode, a cellular transmitter, a Wi-Fi transmitter, a ZigBee transmitter, or the like. Alternatively, the transmitter 382 can include a wired interface, such as USB (Universal Serial Bus), mini-USB, micro-USB, or the like.

The power source 386 may include a battery, for example a lithium-ion battery. Other power sources are also contemplated, for example a fuel cell, a solar cell, or the like. Alternatively, the usage attachment 302 can receive power from the power tool to which the usage attachment 302 is coupled. For example, the usage attachment 302 can be electrically connected to the power tool via a USB, micro-USB or a mini-USB connection that can be used to transfer power from the power tool to the usage attachment 302.

Most power tools vibrate when they are operated. Vibrations are generated due to the operation of the electric motor that is powering the power tool, for example the electric motor 254. Some power tool types generate distinct vibration data. It is often possible to identify the type of an unknown power tool by comparing the vibration data of the unknown power tool to predetermined vibration data of a known power tool.

Figure 4:
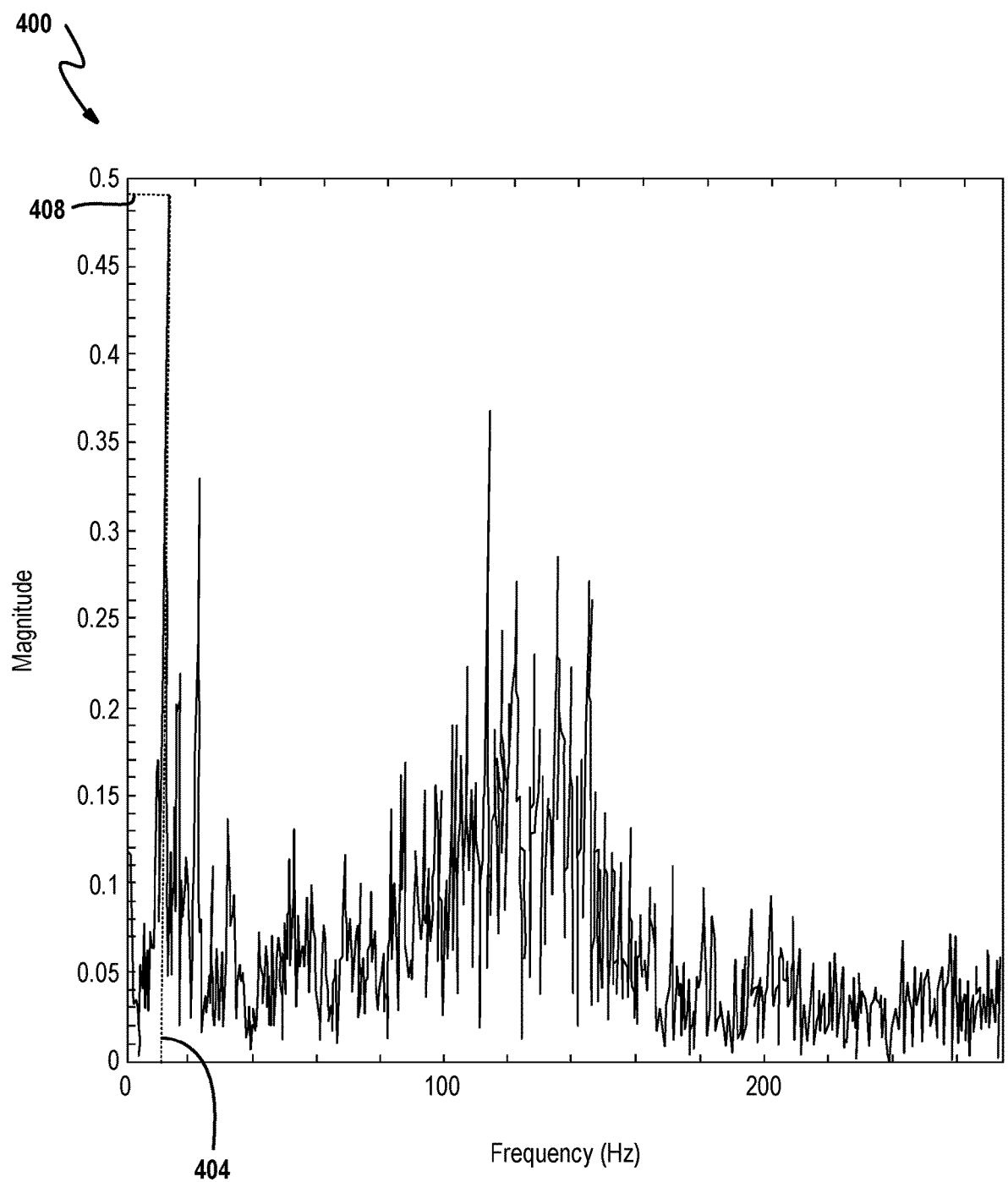
FIGS. 4 to 6 are frequency spectrum diagrams illustrating example vibration data of known power tool types.
Figure 5:
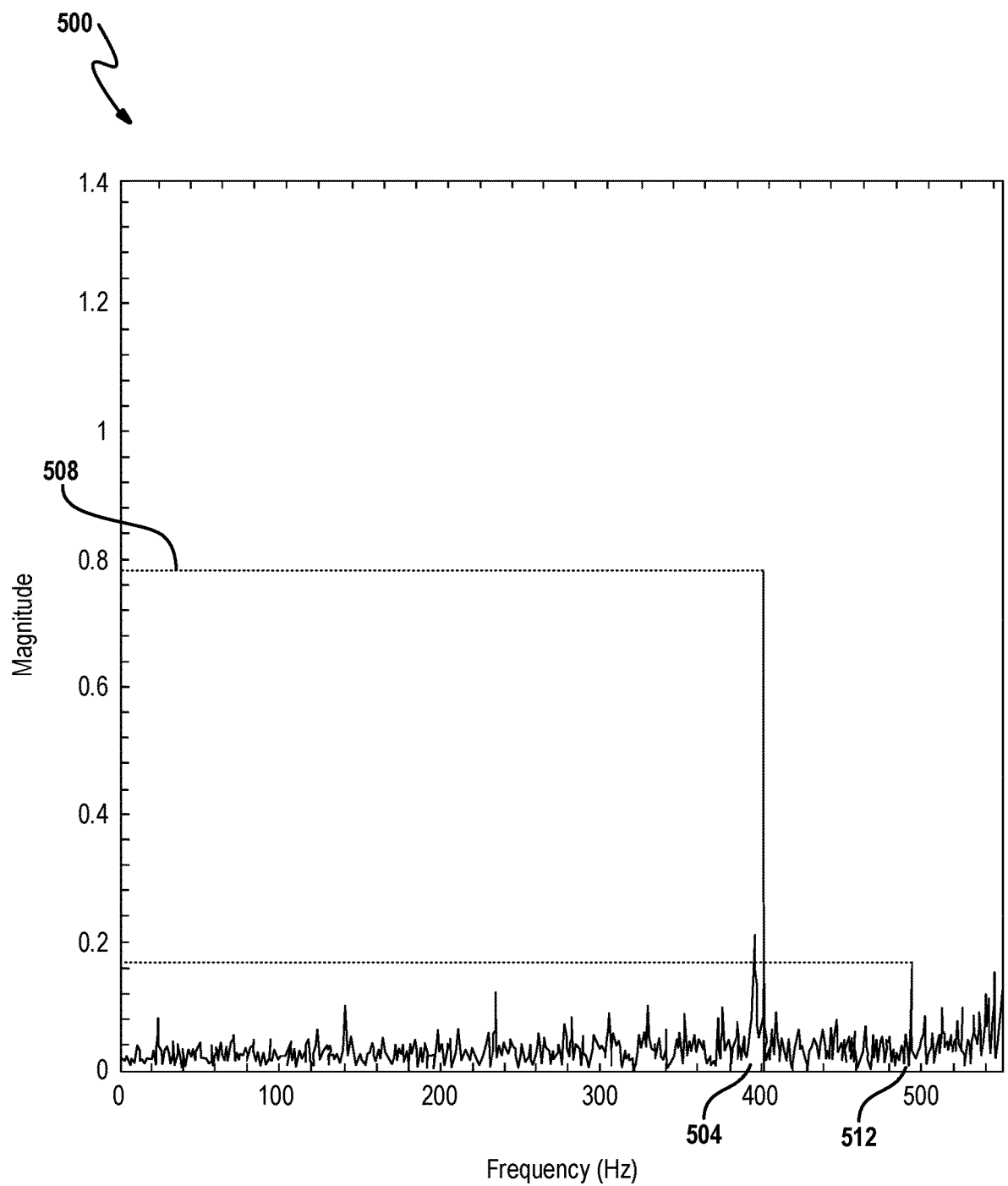
Figure 6:
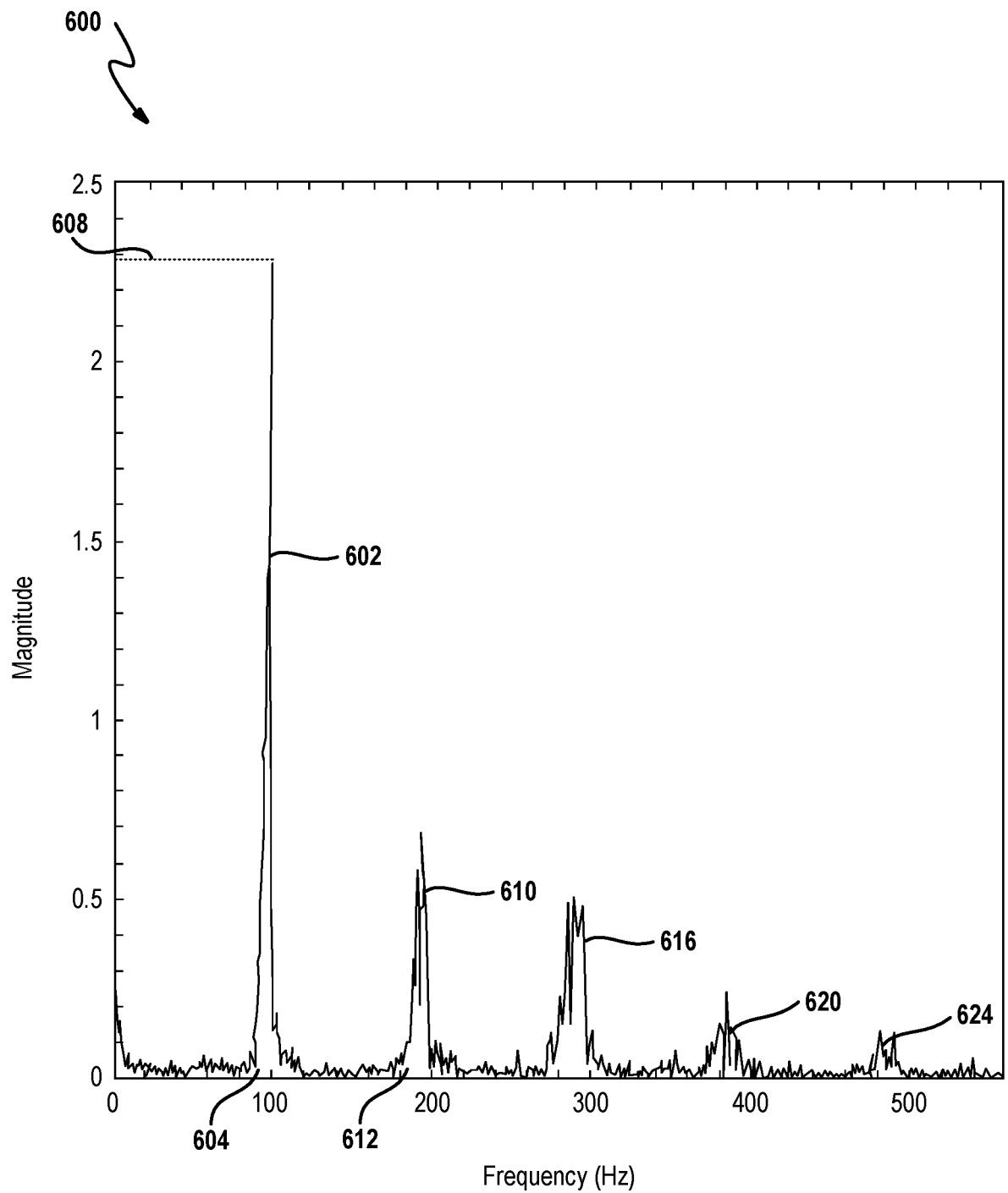

FIGS. 4 to 6 are frequency spectrum diagrams of example vibration data of example known power tool types. The vibration data has been transformed into frequency domain, for example by applying a Fourier transform to the time domain vibration data captured by the vibration sensor 272 or 372. FIG. 4 illustrates vibration data 400 of a first known type of power tool. In this embodiment, the vibration data 400 is for an example power drill manufactured by Stanley Black & Decker ("power drill", hereinafter).

When the power drill is operated under a loaded condition, the vibration data 400 includes a dominant resonant frequency 404 which ranges from about 4 Hz to 8 Hz. At the dominant resonant frequency 404, the power drill has a maximum magnitude 408. The dominant resonant frequency 404 corresponds with a drill bit speed that ranges from 240 rpm to 480 rpm. When the power drill is being operated under a no load condition, then the power drill exhibits a dominant resonant frequency at about 415 Hz which corresponds to 24,900 rpm. In this example embodiment, an unknown power tool can be identified as the power drill when the vibration data of the unknown power tool exhibits a dominant resonant frequency that ranges from about 4 to 8 Hz or is at about 415 Hz. In another example embodiment, an unknown power tool can be identified as the power drill when the vibration data of the unknown power tool exceeds a threshold magnitude within a frequency range of about 2 to 10 Hz or 410 Hz to 420 Hz.

FIG. 5 is a frequency spectrum diagram illustrating vibration data 500 for a second known type of power tool. In this embodiment, the vibration data 500 is for an example electric jigsaw manufactured by Stanley Black & Decker ("electric jigsaw" hereinafter). Under a loaded condition, the vibration data 500 includes a first dominant resonant frequency 504 that ranges from 260 Hz to 440 Hz. At the first dominant resonant frequency 504, the vibration data 500 has a maximum magnitude 508. Although there is an overlap between the dominant resonant frequencies of the power drill (415 Hz) and the electric jigsaw, the electric jigsaw has a second dominant resonant frequency 512 that ranges from about 500 Hz to 680 Hz. Therefore, an unknown power tool can be identified as the electric jigsaw, if the vibration data of the unknown power tool exhibits a first dominant resonant frequency that ranges from about 260 Hz to 440 Hz and a second dominant resonant frequency that ranges from about 500 Hz to 680 Hz. An unknown power tool that has a dominant frequency at about 415 Hz but does not have any dominant frequencies at or above 500 Hz can be identified as the power drill.

FIG. 6 illustrates vibration data 600 for a third known type of power tool. In this embodiment, the vibration data 600 is for an example electric sander manufactured by Stanley Black & Decker ("electric sander" hereinafter). The vibration data 600 exhibits a plurality of harmonics. A first harmonic 602 occurs at a fundamental frequency 604. At the fundamental frequency 604, the vibration data 600 has a maximum magnitude 608. A second harmonic 610 occurs at a frequency 612 that is twice the fundamental frequency 604. The vibration data 600 also exhibits third, fourth and fifth harmonics 616, 620, 624. The following shows fundamental and second harmonic frequency values for the electric sander under different load conditions:

|  | Very heavy load | Moderate load | No load |
| --- | --- | --- | --- |
| Fundamental | 60 Hz | 105 Hz | 125 Hz |
| Second Harmonic | 120 Hz | 210 Hz | 250 Hz |

An unknown power tool can be identified as the electric sander, if the vibration data of the unknown power tool includes one of the above pairs of fundamental and second harmonics.

Figure 7:
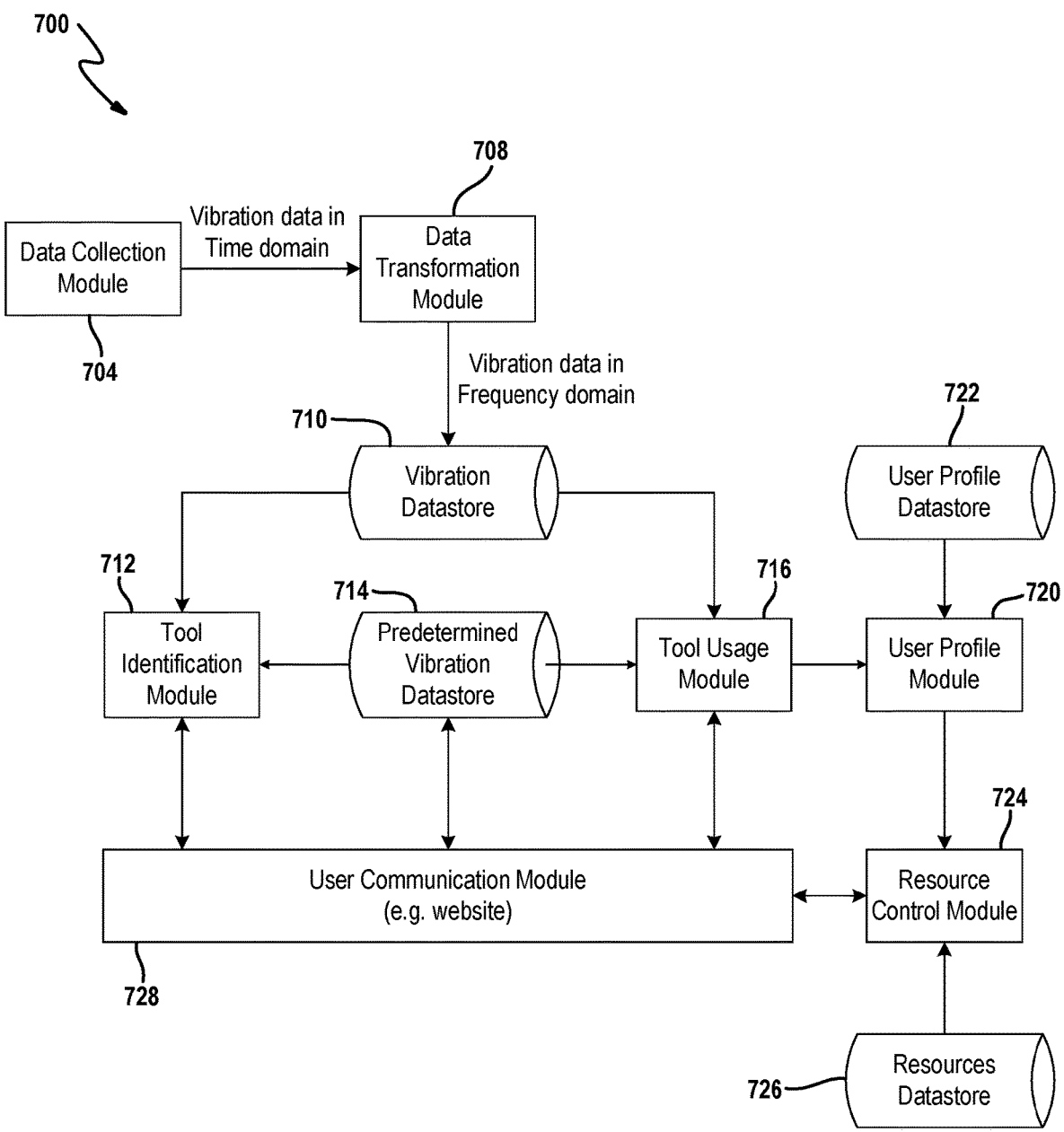
FIG. 7 is a block diagram of the example system depicted in FIGS. 1A and 1B.
Figure 8:
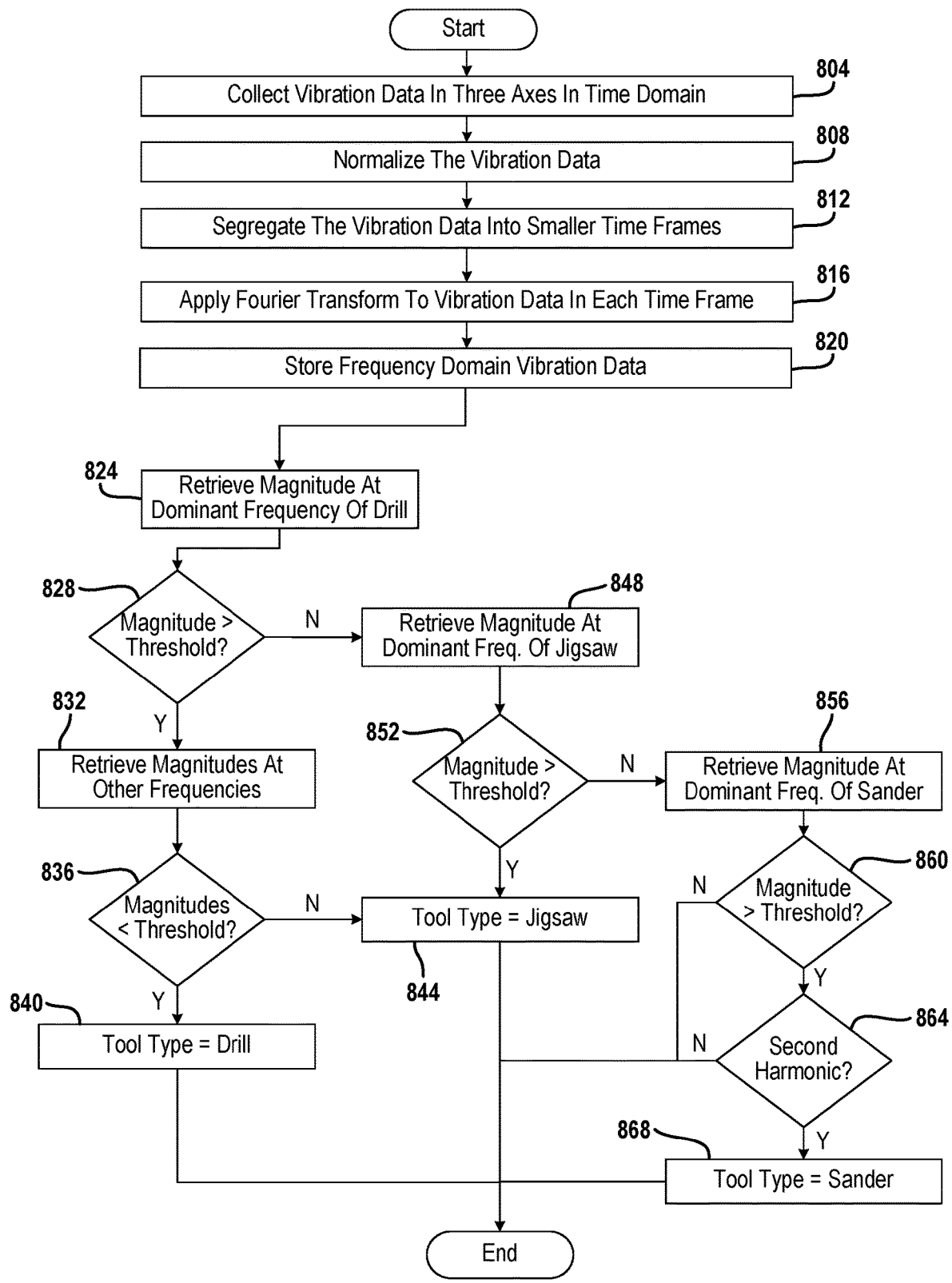
FIG. 8 is a flow diagram illustrating an example method for identifying the type of an unknown power tool.

FIG. 7 is a block diagram illustrating an example system 700 for identifying the type of an unknown power tool. The system 700 collects usage data for an unknown type of power tool and identifies the type of the power tool by comparing the collected usage data with predetermined usage data corresponding with one or more known types of power tools. As mentioned above, the collected usage data and the predetermined usage data may include a combination of vibration data, sound data, light data, temperature data, current data or the like. As exemplified below, the system 700 may identify the type of the power tool as a known type of power tool if the vibration data of the unknown power tool includes a dominant resonant frequency that matches a dominant resonant frequency of the known type of power tool.

In this example embodiment, the system 700 includes a data collection module 704, a data transformation module 708, a tool identification module 712, a tool usage module 716, a user profile module 720, a resource control module 724 and a user communication module 728. In this example embodiment, the system 700 resides in the server 198. In another example embodiment, the data collection module 704 and the data transformation module 708 reside in the power tool 250 or the usage attachment 302 and the tool identification module 712, the tool usage module 716, the user profile module 720, the resource control module 724 and the user communication module 728 reside in the server 198.

The data collection module 704 collects vibration data (at 804) in time domain from a vibration sensor, for example via the vibration sensors 272, 372. The data collection module 704 may normalize the vibration data (at 808) and send the normalized vibration data to the data transformation module 708. In some embodiments, the vibration sensors 272, 372 include 3-axis accelerometers and the data collection module 704 collects and normalizes vibration data in each axis.

The data transformation module 708 transforms the vibration data from time domain to frequency domain. The data transformation module 708 may apply a Fourier Transform, a Fast Fourier Transform or a Short Time Fourier Transform to transform the vibration data from the time domain to the frequency domain. In this embodiment, the data transformation module 708 applies the Short Time Fourier Transform by segregating the vibration data into smaller time frames (at 812) and applying the Fourier Transform or the Fast Fourier Transform to the vibration data in each time frame (at 816). The data transformation module 708 may reside in the power tool 250, the usage attachment 302, the mobile phone 196 or the server 198.

After the vibration data is transformed into frequency domain, the data transformation module 708 stores the frequency domain vibration data in a vibration datastore 710 (at 820). The vibration datastore 710 stores magnitudes of the vibration data at various frequencies. Alternatively, the data transformation module 708 can send the frequency domain vibration data to the tool identification module 712 and/or the tool usage module without storing the frequency domain vibration data in the vibration datastore 710.

The tool identification module 712 identifies the type of the power tool by comparing the vibration data to predetermined vibration data of a known type of power tool. The tool identification module 712 retrieves vibration data of the unknown power tool from the vibration datastore 710 and predetermined vibration data of a known tool type from a predetermined vibration datastore 714. The predetermined vibration datastore 714 may store predetermined vibration data for a plurality of known types of power tools, for example in a table as shown below:

|  | No load | | Load | |
| --- | --- | --- | --- | --- |
|  | 1$^{st}$ freq. (Hz) | 2$^{nd}$ freq. (Hz) | 1$^{st}$ freq. (Hz) | 2$^{nd}$ freq. (Hz) |
| Power drill | 415 | — | 4-8 | — |
| Electric Jigsaw | 500 | — | 260-440 | 500-680 |
| Electric Sander | 60 | 120 | 105-125 | 210-250 |

The tool identification module 712 starts by comparing the vibration data of the unknown power tool with predetermined vibration data of the power drill. The tool identification module 712 retrieves a magnitude of the vibration data at 415 Hz (at 824), where 415 Hz corresponds with the dominant resonant frequency of the power drill under a no load condition. The tool identification module 712 determines whether the magnitude at 415 Hz exceeds an example threshold of 0.4 (at 828). If the magnitude exceeds the example threshold of 0.4 then the unknown power tool can be a power drill that is under no load or an electric jigsaw that is under load.

To determine whether the unknown power tool is a power drill or an electric jigsaw, the tool identification module 712 retrieves magnitudes for the vibration data at frequencies ranging from about 500 to 680 Hz (at 832). The tool identification module 712 determines whether the magnitudes at frequencies ranging from 500 to 680 Hz are below an example threshold of 0.1 (at 836). If the magnitudes at the frequencies ranging from 500 to 680 Hz are below the example threshold of 0.1, then the tool identification module 712 identifies the type of the power tool as the power drill (at 840). If the magnitude at any frequency ranging from 500 to 680 Hz exceeds the example threshold of 0.1, then the type of the power tool is identified as the electric jigsaw (at 844). The tool identification module 712 may also identify the type of the power tool as the power drill if a magnitude of the vibration data exceeds the example threshold of 0.4 at any frequency ranging from 4 Hz to 8 Hz, where the frequency range of 4-8 Hz corresponds with the dominant resonant frequency of the power drill under load.

If, at 828, the tool identification module 712 determines that the unknown power tool is not a power drill, then the tool identification module 712 compares the vibration data of the unknown power tool with predetermined vibration data of the electric jigsaw. The tool identification module 712 retrieves magnitudes of the vibration data of the unknown power tool at frequencies ranging from 260-440 Hz and 500 Hz-680 Hz (at 848). The magnitudes between 260-440 Hz are compared with a first example threshold of 0.6 and the magnitudes at 500-680 Hz are compared with a second example threshold of 0.1 (at 852). If both the first and second example thresholds are exceeded, then the type of the power tool is identified as the electric jigsaw (at 844). Since both the first and second thresholds are exceeded, the power tool, which is identified to be a jigsaw, is under load and has a frequency spectrum similar to FIG. 5.

If, at 852, the tool identification module 712 determines that the unknown power tool is not an electric jigsaw, then the tool identification module 712 compares the vibration data of the unknown power tool with predetermined vibration data of the electric sander. The tool identification module 712 retrieves magnitudes of the vibration data at the electric sander fundamental frequencies of 60 Hz, 105 Hz and 125 Hz (at 856). The tool identification module 712 determines whether the retrieved magnitudes exceed an example threshold of 2.0 (at 860). If magnitudes at any one of the electric sander fundamental frequencies exceeds the example threshold of 0.2, then the tool identification module 712 determines whether the vibration data exhibits a second harmonic (at 864). The tool identification module 712 may check for the second harmonic by determining whether a magnitude at twice the fundamental frequency exceeds an example threshold of 0.5. For example, if the magnitude at 105 Hz exceeded the example threshold 2.0, then the tool identification module 712 determines whether the magnitude at 210 Hz exceeds the example threshold 0.5. If both the example thresholds are exceeded, then the vibration data resembles FIG. 6 and the type of the power tool is identified as the electric sander (at 868).

In an example embodiment, the tool identification module 712 receives a sensor ID (i.e., a unique identifier such as a serial number assigned to each usage attachment) that identifies the identity of the usage attachment 102 that captured the vibration data. The tool identification module 712 retrieves a list of power tools that are associated with the sensor ID. The list represents the power tools that a user of the usage attachment 102 owns. The user may provide the list of power tools through the user communication module 728. In this example embodiment, the tool identification module 712 only compares the received vibration data with predetermined vibration data of the power tools that are on the list. For example, if the user owns a power drill and an electric sander, then vibration data received from the user is only compared with predetermined vibration data corresponding with the power drill and the electric sander and not other power tools, such as the electric jigsaw, that the user does not own.

Figure 9:
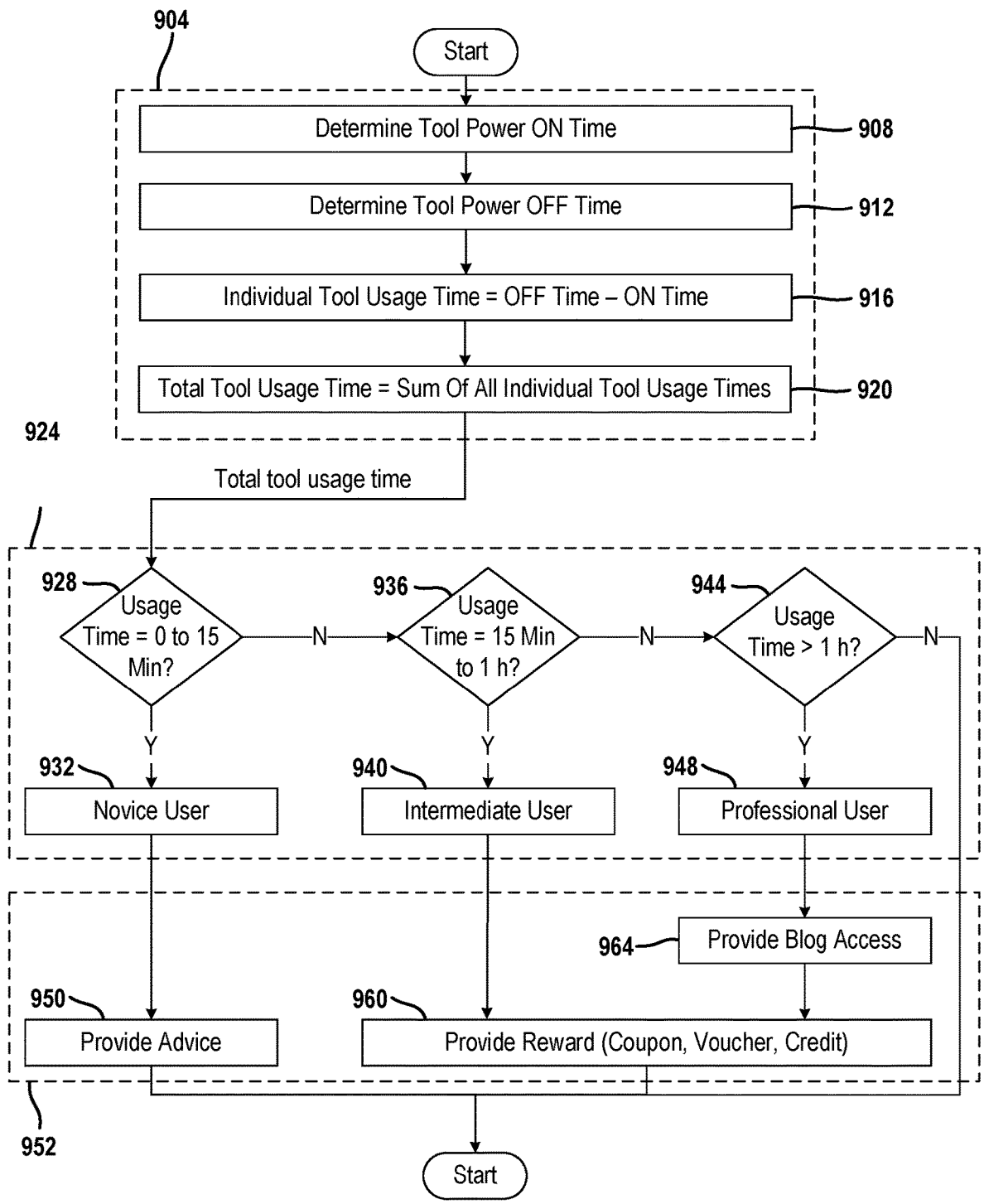
FIG. 9 is a flow diagram illustrating an example method for identifying a user profile.

Referring now to FIGS. 7 and 9, the tool usage module 716 determines how the power tool is being used based on the vibration data. The tool usage module 716 determines a total tool usage time (at 904). The tool usage module 716 may determine the total tool usage time by determining an individual tool power ON time (at 908), an individual tool power OFF time (at 912), determining an individual tool use time by calculating a time difference between the power ON time and the power OFF time (at 916) and adding all the individual tool use times to arrive at the total usage time (at 920). The tool usage module 716 communicates the total tool usage time to the user profile module 720 and/or the user communication module 728. The tool usage module 716 may determine the power tool switch ON time (at 908) by comparing the vibration data with predetermined vibration data that corresponds with the power tool being switched ON. The tool usage module 716 may determine a power tool switch OFF time (at 912) by comparing the vibration data with predetermined vibration data that corresponds with the power tool being switched OFF. In this embodiment, the total tool usage time is for a single power tool. A particular user may be identified as a professional at using a power drill but only as intermediate at using an electric jigsaw, for example. In another example embodiment, the total tool usage time may be for all the power tools owned by a particular user.

The user profile module 720 determines a user profile. A user profile datastore 722 stores threshold values that correspond with example user profiles. For example, the user profile datastore 722 may store a table similar to the following:

| Total tool usage time | User profile |
|---|---|
| 0 to 15 minutes | Novice |
| 15 minutes to 1 hour | Intermediate |
| More than 1 hour | Professional |

It is readily understood that these time values are merely examples and other values may be used to classify users.

In this embodiment, the user profile module 720 determines the user profile based on the total tool usage time (at 924). The user profile module 720 determines whether the total tool usage time is between 0 and 15 minutes (at 928). If the total tool usage time is between 0 and 15 minutes, the user profile module assigns the user a novice user profile (at 932). If the total tool usage time exceeds 15 minutes, then the user profile module 720 determines whether the total tool usage time is between 15 minutes and 1 hour (at 936). If the total tool usage time is between 15 minutes and 1 hour, then the user profile module 720 assigns the user an intermediate user profile (at 940). If the total tool usage time exceeds 1 hour, then the user profile module 720 confirms whether the total tool usage time is greater than 1 hour (at 944). If the total tool usage time is greater than 1 hour, then the user profile module 720 assigns the user a professional user profile (at 948). The user profile module 720 sends the determined user profile to the resource control module 724.

The resource control module 724 provides the user with access to resources based on the user profile (at 952). The resources may include tool instructions, coupons, vouchers, credits that are stored in a resources datastore 726. The resource control module 724 may provide a novice user advice on how to user the power tool (at 956). The advice may include instructions on how to hold the power tool or when to switch the power tool OFF to prevent excessive heating of the power tool. The resource control module 724 may provide an intermediate user and a professional user with rewards (at 960). Example rewards include coupons, vouchers, or the like. The resource control module 724 may provide a professional user with access to an internet blog (at 964).

In another example embodiment, the resource control module 724 provides the novice, intermediate and professional users with access to the internet blog and displays indicia on the internet blog to indicate the profile of the user (e.g. 'newbie' for novice, 'PRO' for professional, etc). In yet another example embodiment, the resource control module 724 provides users access to different blogs depending their assigned user profile; that is, a novice user is provided access to a novice users blog, an intermediate user is provided access to an intermediate users blog and a professional user is provided access to a professional users blog.

In another example embodiment, the user profile module 720 assigns a user profile to the user based on the number of tools that the user is using. For example, a user who routinely uses 1-2 tools may be assigned a 'bronze' user profile, a user who uses 3-5 tools may be assigned a 'silver' user profile and a user who uses more than 6 tools may be assigned a 'gold' user profile. This user profile may be assigned in addition to or instead of the user profile that is assigned based on tool usage, as described above.

In another example embodiment, the tool usage module 716 may determine a number of times the power tool has been dropped and the user profile module 720 may assign a user profile based on the number of drops. For example, if the number of drops exceeds 10, then the user profile module 716 may assign the user a novice user profile. The number of drops may be used instead of or in addition to using the total tool usage time for determining a user profile. In one scenario, if the number of drops exceeds 10 for every hour of total tool usage time then the user profile module 716 may assign the user a novice user profile. In another scenario, if a professional user drops the power tool more than a certain number of times, then the user profile of the professional user may be downgraded to an intermediate user. In this embodiment, the tool usage module 716 may determine the number of drops by comparing the vibration data with predetermined vibration data corresponding with the power tool being dropped.

In another example embodiment, the tool identification module 712 may identify the type of the unknown power tool based on the orientation of the usage attachment 102 with respect to the power tool 150. Two power tools may have dominant resonant frequencies that coincide with each other. In such scenarios, the usage attachment 102 can be attached to a first power tool in a first orientation such that the dominant resonant frequency appears in a first axis, for example the X-axis. The usage attachment 102 can be detached from the first power tool and attached to the second power tool in a second orientation that is different from the first orientation, so that the dominant resonant frequency appears in a second axis, for example the Y-axis. Even though the dominant resonant frequencies of the two power tools coincide, the dominant resonant frequencies appear in different axes thereby allowing identification of the power tool types even when the dominant resonant frequencies of the power tools coincide.

The user communication module 728 may be an internet website that allows a user to enter a list of power tools that the user owns. The user provides the sensor ID corresponding with the user's usage attachment. The list is associated with the sensor ID to assist the tool identification module 712 as explained above. The internet website may allow different users to interact with each, ask questions and give advice to each other regarding their power tools. The user communication module 728 can also be used to administer tests, quizzes or challenges to users. Completion of the tests, quizzes or challenges can result in rewards for the user. Certain challenges may only be given to professional users. The Internet website is a non-limiting example of the user communication module 728. In other example embodiments, the user communication module 728 may include an application that can be executed on the mobile phone 196.

In an example embodiment, the user communication module 728, may communicate the remaining useful life of a component of the power tool based on the usage data and may notify the user on when to replace the component. The user communication module 728 may notify the user to replace a battery of the power tool when the usage data indicates that the charge level of the battery is below a particular threshold (e.g. below 10%). For example, if the battery of a power drill is known to last for 40 hours and the usage data indicates that the user has used the power drill for 38 hours then the user communication module 728 may notify the user to replace or recharge the battery. In another example scenario, the user communication module 728 may notify the user to replace the power tool or seek service if the captured sound data indicates that the power tool is not functioning as intended. For example, if the captured vibration or sound data shows a gradual shift in the frequency at which the dominant vibrations or sounds occur, then the power tool may be deteriorating and the user communication module 728 may notify the user to replace the power tool.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor, where code, as used above, may include software, firmware, and/or microcode, and may refer to programs, routines, functions, classes, and/or objects.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vibration monitoring system for use in a power tool, the system comprising:
   a controller operable to log an amount of time that the power tool is in use throughout a duration of a predetermined time period; and
   an indicator for providing a first message to a user of the power tool when the amount of time for the one of the users exceeds a predetermined threshold;
   wherein the system includes a wireless transmitter for wirelessly transmitting usage time of the power tool to at least one of a smart device or a computer database for logging the usage time;
   further comprising a user profile module;
   wherein the user profile module determines a user profile according to the tool usage time; and
   further comprising a resource control module which provides resources to a user based on the user profile.

2. The vibration monitoring system of claim 1, wherein the amount of time that the power tool is in use is related to the amount of vibration exposure experienced by the user of the power tool.

3. The vibration monitoring system of claim 1, wherein the message is a visual signal.

4. The vibration monitoring system of claim 1, wherein the first message corresponds to a transition from a first vibration exposure level to a second vibration exposure level.

5. The vibration monitoring system of claim 4, wherein the predetermined threshold is a first predetermined threshold, and wherein the indicator is configured to further provide a second message to the user of the power tool when the amount of time exceeds a second predetermined threshold greater than the first predetermined threshold.

6. The vibration monitoring system of claim 5, wherein the second message corresponds to a transition from the second vibration exposure level to a third vibration exposure level.

7. The power tool of claim 1, wherein the resources include at least one of tool instructions, coupons or vouchers.

\* \* \* \* \*